1,663,507

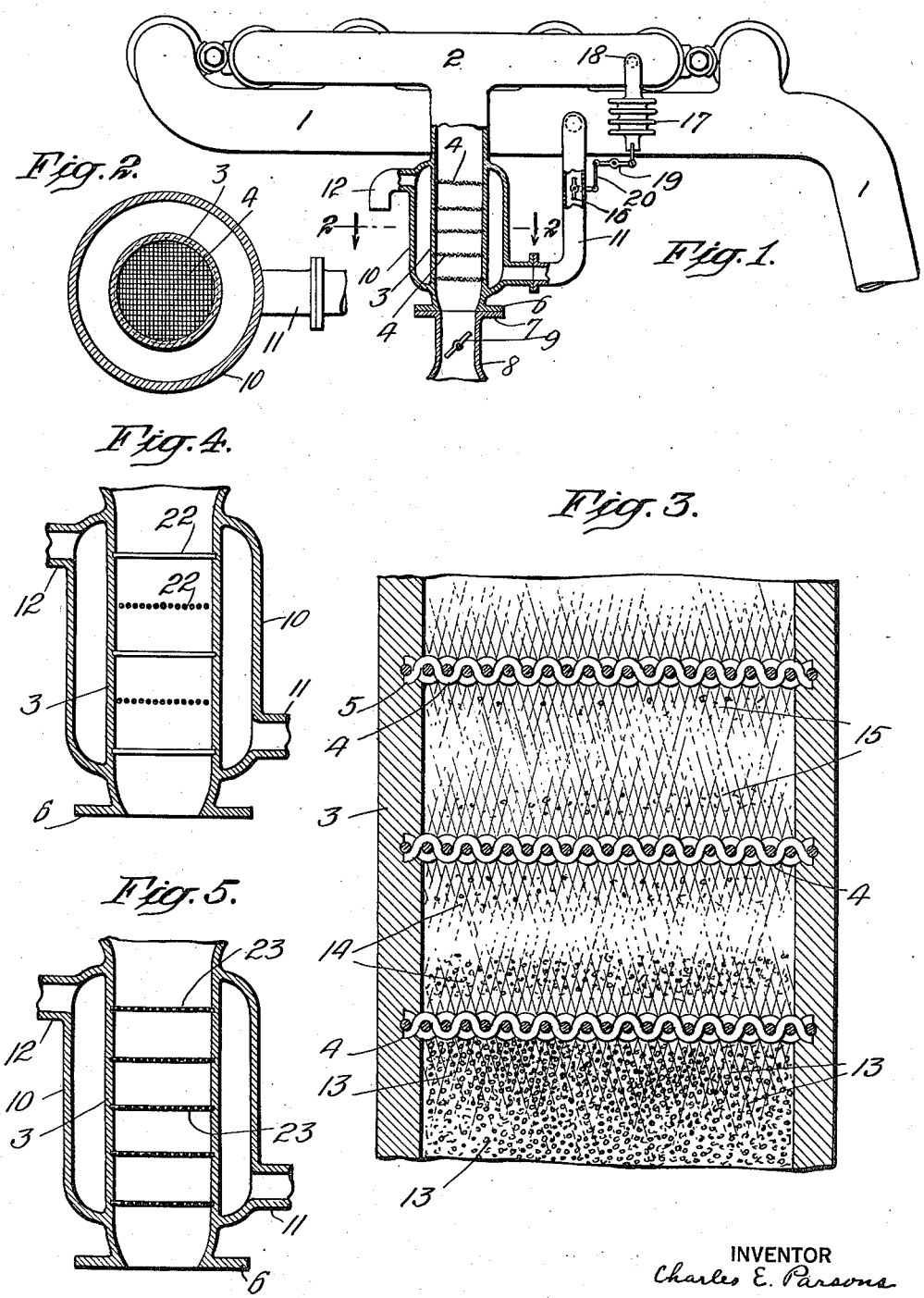
March 20, 1928. 1,663,507
C. E. PARSONS
PROCESS OF PREPARING A DRY GASEOUS FUEL MIXTURE FOR INTERNAL COMBUSTION ENGINES
Filed Aug. 14, 1926
INVENTOR
Charles E. Parsons
BY
Lockwood
ATTORNEY Patented Mar. 20, 1928.

UNITED STATES PATENT OFFICE.

CHARLES E. PARSONS, OF ENGLEWOOD, NEW JERSEY, ASSIGNOR TO WILLIAM P. DEPPÉ, OF NEW YORK, N. Y.

PROCESS OF PREPARING A DRY GASEOUS FUEL MIXTURE FOR INTERNAL-COMBUSTION ENGINES.

Application filed August 14, 1926. Serial No. 129,193.

This invention relates more particularly to an improved process or method for producing a homogeneous dry gaseous mixture from liquid fuels and air, by equilibrium vaporization in the intake system of internal combustion engines. The method of producing a superheated dry gaseous mixture and operating an engine thereon is the invention of William P. Deppé, and a more complete description of his method and apparatus will be found in his Patents No. 1,335,665, of March 30, 1920, and No. 1,360,098 of November 23, 1920. These patents are the first to describe a method of complete vaporization with the production of a superheated dry gaseous mixture under equilibrium conditions.

It is well known to those skilled in the art that in vaporizing liquid fuels in air mixtures, one is dealing with partial pressure boiling points. Furthermore, it is obviously desirable to apply the method in as compact a manner as possible and so that heat for vaporization is applied to the liquid fuel, not only by conduction in air but transversely of the mixture stream through a multiplicity of metallic contacts throughout the gaseous mixture.

The object of my improvement, therefore, is to provide an improved method of equilibrium vaporization, whereby a more compact apparatus may be employed to effect complete vaporization with minimum superheating of the mixture, at a relatively high rate of vaporization, at the same time providing for uniform distribution to all the cylinders of the engine of a completely homogeneous dry gaseous mixture.

It is now well known that, for the best results, both as to uniform distribution and smooth operation, the liquid fuels should be completely vaporized in the intake system and so conditioned and passed through suitably heated conduits as to remain dry and gaseous during and after introduction into the engine cylinders, for it is obvious that complete combustion is assured only when the reaction takes place between gases or gaseous substances, in proper ratios.

It has been repeatedly demonstrated, not only by laboratory tests, but under actual operation conditions, that complete vaporization of the liquid fuels, with the formation and maintenance of a homogeneous dry gaseous mixture, under minimum superheat conditions, provides numerous advantages in the operation of the engine. Some of these advantages may be enumerated as follows:—

A completely dry homogeneous mixture facilitates uniform distribution to all the cylinders.

Such a mixture not only promotes uniform combustion but, with proper fuel to air ratio, makes for complete combustion with the elimination of carbon monoxide.

A completely dry homogeneous gaseous mixture may be subjected to higher compression pressures than a wet mixture, and, while promoting uniform combustion, decreases the tendency of knocking or so-called detonation.

Furthermore, a completely homogeneous dry gaseous mixture, in proper ratio, will give increased fuel efficiency over a wet mixture, and, when introduced into the engine cylinders, remains completely dry and homogeneous, that is, only in the gaseous phase, hence, crank case dilution is eliminated. Therefore, complete vaporization with a minimum amount of superheating of the fuel vapors, is essential for the maximum realization of the advantages just enumerated.

It will be understood that vaporization under equilibrium conditions must not be confused with wet mixture vaporization in heated manifold devices, wherein the vaporization takes place under more or less fractional distillation conditions. Such fractional vaporization conditions are found in prior art apparatus, the operation of which results in incomplete vaporization and lack of homogeneity in the mixture. Furthermore, the molecular species in such wet mixture heating, vary from one part of the mixture to another, for, with irregular vaporization, liquid particles are carried along and non-volatile residues formed, such as are well known under Engler flask vaporization conditions. Under these conditions, even relatively high temperatures do not completely volatilize the liquid fuels, but tend to leave heavy liquid products and to crack portions thereof, or the fuels may be decomposed with the formation of residual products which cannot be distilled or vaporized within operation conditions, and which ultimately may be deposited as carbon or tarry products in the intake system or combustion chamber. Furthermore, such incomplete and fractional vaporization, with the high temperature required for heavy ends, results in a relatively low volumetric efficiency in the engine.

On the other hand, operation under equilibrium conditions, permitting complete vaporization of motor fuels at a minimum temperature (hence minimum superheat) giving a homogeneous mixture without decomposition or residues, will not only give maximum fuel efficiency, but will result in all of the advantages previously enumerated. A homogeneous dry gaseous mixture of this character may be produced in the intake manifold during the operation of the engine, under equilibrium conditions, as hereinafter more fully described.

Reference has been made to "equilibrium vaporization" and "complete vaporization under equilibrium conditions" and for this reason, it may be desirable to define equilibrium vaporization as follows:—Equilibrium vaporization is the complete volatilization of liquids maintained in such intimate relation at every step with all the vapors from the liquids that throughout the process or, as in the present instance, until complete vaporization results, all the vapors from the liquids remain in equilibrium with all of the unvaporized liquids. The point of complete vaporization of liquid fuels under equilibrium conditions is the same as the dew point or the point of initial condensation of the vaporized fuel. The dew point or point of condensation which corresponds to the boiling or vaporization point, is the lowest temperature at which the liquid fuels can be completely vaporized.

It has been demonstrated by comparative tests of equilibrium vaporization and fractional distillation that commercial gasoline in its own vapors without the admixture of air, can be completely vaporized by equilibrium vaporization at from 110° F. to 125° F., lower temperature than the so-called end point in Engler flask fractional distillation which, as previously pointed out, leaves a residue and, therefore, is not complete vaporization. Obviously, if equilibrium vaporization can be carried out in the intake of the engine in an air mixture at the approximate 15 to 1 ratio for complete combustion and at a minimum superheat temperature, the best possible mixture for maximum volumetric efficiency will be obtained. For example, commercial gasoline, as now sold to the public can be completely vaporized in a 15 to 1 air fuel mixture at atmospheric pressure, under equilibrium conditions, at approximately 120° F. to 130° F. Obviously, in mixtures of air and liquid fuels, vaporization will take place according to Dalton's law as to partial pressures and the dew point or temperature of complete vaporization under equilibrium conditions, represents the partial pressure boiling point of the fuels in the air ratio employed.

Equilibrium vaporization not only produces complete volatilization of the gasoline at minimum temperature but also produces a gaseous mixture so perfectly homogeneous that it represents but one phase. This complete gaseous mixture is the ideal form in which to distribute the fuel; it will burn perfectly so that no liquid fuel is left, and carbon monoxide and other undesirable products are avoided; its perfect and smooth combustion diminishes so-called detonation, and no liquid fuel particles are added to the lubricant.

Any suitable means may be employed for accomplishing my improved method for the equilibrium vaporization of complex motor fuels, such as present day commercial gasoline, in the intake system of internal combustion engines. In the present instance, this means consists in the employment of a succession of spaced metallic screens or foraminated members placed across and adapted to intercept the entire current of air and motor fuel in the intake system, for transversely filming the liquids in the air stream at a multiplicity of points, the screens being in metallic contact with heated walls of the mixture conduit. Such metallic foraminated members may consist of wire mesh, grids, perforated plates, or rods closely spaced. Screens of this character, therefore, are adapted to supply heat to the stream of mixture, and to filmed liquid particles, at a multiplicity of points across the entire line of mixture flow and thus provide the most efficient means for transversely filming and vaporizing the liquid fuels and heating the mixture throughout its mass. As previously stated, the peripheral edges of the foraminated members are preferably in heat conducting engagement with the walls of the intake conduit so that heat is most efficiently transmitted by conduction from the walls of the conduit through the screens to liquid films formed thereon and to the stream of fuel and air, to a sufficient extent to complete the vaporization. In the present instance, metallic screens may be cast integrally with the mixture conduit walls in order to provide maximum heat conductance. A controlled supply of heat for heating the screens is preferably furnished by the engine exhaust gases passing through a heating jacket around the mixture conduit, the supply of heat being preferably just sufficient to raise the temperature of the liquid fuels above their partial pressure boiling points in the air ratio existing in the intake system. On the other hand, while the supply of heat may vary with vaporization demands and with varying openings of the throttle, it should be so controlled that the temperature of the air-fuel mixture is never sufficient to crack the liquid fuels.

The plurality of metallic screens have the additional advantage of atomizing the liquids and mixing the air and liquid fuels and their vapors, thereby causing turbulence and eddying as the current makes spaces behind these screens of irregular and diminished pressure. It will be understood that agitation and thorough mixing, by which the liquid and vapor and air are kept in intimate relation while heat is applied, is one of the necessary conditions for accomplishing equilibrium vaporization.

Droplets or minute spheres of unvaporized liquids are present, ordinarily, in the intake system of an internal combustion engine operating on a so-called wet mixture, and these small liquid spheres do not readily take up heat for vaporization and for this reason, they are likely to pass as liquids into the combustion chamber. In the means just referred to, the succession of metallic screens, however, catch such liquid particles, break them up, and hold them as films. Heat is thus furnished directly to minute globules, or thin films of the liquid, in which form it possess the greatest vapor tension and evaporates fastest. Sufficient heat for swift and complete vaporization is thus readily furnished directly to the liquid, which is held in a multiplicity of transverse films under conditions most favorable to volatilization. Furthermore, the liquid is kept in intimate contact with the vapor stream passing through the openings in the screen, (which are surrounded by the films) during the process of heating, so that a condition of equilibrium is maintained therebetween.

In methods now widely used for producing equilibrium vaporization the liquid in the stream is vaporized largely by means of an absorption of heat from the air which has been heated at the walls of the conduit and which has then been stirred up with the liquid particles. Experiments show that it has been necessary, under the condition just mentioned, to heat a gasoline air mixture in the intake system of an internal combustion engine considerably above the vaporization or dew point in order to secure complete equilibrium vaporization in the limited areas, as a rule, available in practice.

In carrying out my improvement, various forms of apparatus may be employed, and in the accompanying drawings several forms are indicated. Fig. 1 shows an arrangement of intake and exhaust manifolds in close juxtaposition, with the intake manifold riser jacketed and provided with screens for transverse filming; Fig. 2 shows a cross section of the jacketed portion of the intake manifold on the line 2—2 of Fig. 1; Fig. 3 is an enlarged sectional view, diagrammatically and graphically illustrating the action of the screens; Fig. 4 is a sectional view of a modification employing rods or wires and Fig. 5 is another modification wherein the screens are formed as perforated plates.

Referring to the drawings, the ordinary type of exhaust manifold is represented at 1 and the intake manifold at 2, both of which are shown as adapted for the ordinary four-cycle internal combustion engine. In the present instance the intake manifold 2 is located above the exhaust manifold 1, and so arranged that convection currents and conduction may be utilized for heating the intake manifold to maintain and deliver the mixture to the engine as a superheated dry gaseous mixture. The riser portion 3 of the intake manifold is preferably slightly enlarged, as indicated in the drawings to give sufficient cross sectional areas, in the restricted sections, produced by the insertion of a plurality of metallic screens 4, having their edges embedded in the walls of the intake conduit, as indicated at 5 in Fig. 3, to facilitate good heat conduction. The screens 4 may be of fine mesh woven wire, as indicated in Figs. 1 and 3; or closely spaced rods or wires, having their ends embedded in the walls of the conduit, as indicated in Fig. 4; or perforated (foraminated) sheet metal, as shown in Fig. 5. These screens or foraminous members may be formed of metal, preferably copper, which is a good conductor of heat, and as many of such screens may be employed as is found desirable. In the present instance, satisfactory results have been obtained by employing five screens, as indicated in the drawings, spaced apart about 3/4 of an inch. The number of screens, however, is not limited and may be two, three or as many more as may be required.

It will be understood, as previously stated, that in order to provide sufficient free area for the passage of the mixture through the intake manifold riser, the latter is proportionately enlarged in diameter, so that the open spaces in the screens may be substantially equal in area to the desired cross sectional area for the intake manifold of the engine with which the apparatus is to be employed. For instance, in a twenty mesh wire screen the open space is about 56%.

The lower end of the riser is provided with a flange 6, cooperating with a flange 7 on the carburetor 8, for securing the latter in cooperative relation with the intake manifold. The usual throttle valve, represented at 9, is provided for controlling the admission of the mixture of air and liquid fuels to the riser of the intake manifold. It has been previously pointed out that, during the operation of the engine, as the mixture from the carburetor is drawn through the intake manifold by suction, the screens 4, being arranged in the path of the mixture flow, are adapted to catch and retain, by adhesion, liquid particles carried along in the air mixture. The liquid fuels thus caught will spread out, transversely of the mixture stream, over the wires or solid portions of the screens, in the form of thin films, thus surrounding the innumerable minute openings of the screen with liquid films and minute particles, so as to insure intimate contact, under suitable temperature and equilibrium conditions, between the vapors and unvaporized liquid at all points within and transversely of the mixture stream. Any excess liquids from the first screen will break away and be carried by the air-vapor current and deposited on the second screen, always in contact with the corresponding equilibrium vapor, and so on.

The riser section 3 of the intake manifold is surrounded by a jacket 10 which is connected by means of a conduit or pipe 11 with the exhaust manifold 1, so that the riser section 3 may be heated, the jacket being provided with an outlet at 12, for escape of the exhaust gases after they have passed through the jacket. It has previously been pointed out that close metallic connections between the screens 4 and the heated wall 3 of the riser conduit is essential and this is preferably obtained by casting the peripheral edges of the screens into the walls of the conduit, as shown in Fig. 3. Therefore, since the walls of the conduit are heated by the exhaust gases passing through the jacket 10, the screens 4 will be uniformly heated by direct conduction of heat thereto from the walls of the conduit. As indicated graphically in Fig. 3, the spacing between the screens 4 will permit alternate expansion of the mixture passing through the successive screens and hence the mixture is subjected to alternate contraction and expansion as indicated by the converging and diverging lines in Fig. 3. Furthermore, since the screens are heated, as previously pointed out, the liquid films formed transversely on the successive screens will be heated, as well as the air fuel mixture, thereby vaporizing the liquid fuels in the presence of their own vapors, that is, vaporization will take place under equilibrium conditions.

In the sectional diagram of Fig. 3, the action of the apparatus is graphically indicated by the lines representing the flow and the dots or small circles representing minute spheres or particles of liquid fuels carried along in the air mixture. It will be noted that the air mixture below the lowermost screen 4 in Fig. 3, for instance at 13, is shown as carrying a considerable number of liquid fuel particles, which will be caught and held by the first screen 4, over the solid portions of which they will be filmed. Any excess particles, as indicated at 14, will be carried along in the mixture current and deposited as films on the second screen. All of the screens are substantially uniformly heated by conduction from the walls of the conduit 3, as previously described, thus facilitating rapid vaporization. Any particles of liquid fuels 15 breaking away from or not completely vaporized after passing the second screen will be filmed on the third screen, indicated in Fig. 3. Experience has shown that under ordinary conditions, all the liquid fuels will be completely vaporized upon passing the third screen, particularly when the screens are maintained at a predetermined minimum temperature, that is, a temperature sufficient to complete the vaporization under equilibrium conditions, and but slightly above the dew point for the fuel vapors in the air mixture, thereby producing a homogeneous dry gaseous mixture with a minimum superheat, capable of giving the best possible volumetric efficiency, with complete combustion.

The alternate contraction and expansion effect of the mixture passing through the successive screens creates violent turbulence between the screens, thus thoroughly agitating the mixture, so that, by the time complete vaporization takes place, the mixture is thoroughly homogeneous and dry with a minimum amount of superheat. The temperature of the gaseous mixture in the distributing conduits should be maintained above, and preferably as near the dew-point or point of complete equilibrium vaporization as possible, to insure delivery to the engine of a dry mixture for maximum efficiency, but obviously, the amount of heat required and the temperature for vaporization will vary according to the throttle opening, which varies the amount of liquid fuels taken up and carried along in the mixture, as well as the effective partial pressure. However, the amount of heat in the exhaust gases increases in direct proportion to the amount of fuels consumed so that it is possible to regulate the temperature of the mixture fairly closely by the size of the orifice controlling the flow of exhaust gases through the pipe 11, which, as previously pointed out, is connected with the exhaust manifold 1. It is desirable, however, to regulate the flow of exhaust gases through the connecting pipe 11, by a valve 16 and this valve may be adjusted by manual means to control the size of the orifice and, hence the flow of exhaust gases through the jacket 10, or, as indicated in Fig. 1, a thermo-regulator 17 may be employed. In the latter case, the tubular bulb 18 of the thermostat is preferably located within the intake manifold, so as to effect the regulation according to the temperature of the mixture passing to the cylinders of the engine. The lower end of the thermostat regulator 17 is shown as connected by a lever 19 and link 20, with an arm 21 for operating the exhaust gas regulating valve 16, so as to control the flow of exhaust gases through the jacket 10, according to the temperature of the mixture in the intake manifold. Obviously, by this arrangement, the amount of heat supplied to the screens 4 will vary according to the requirements, the control being such as to maintain equilibrium vaporization conditions substantially uniform, independently of the volume of the flow to the engine.

In Fig. 4, a modification is shown in which rods or wires 22 are mounted transversely of the conduit, the rods or wires being uniformly spaced apart, so as to permit the mixture to pass between them. Successive screens or rods or wires 22 are preferably located in the conduit at right angles to the rods or adjacent screens, so as to break up the mixture currents. The ends of the rods, as with the screens shown in Fig. 3, may be embedded in the walls of the conduit, so as to provide for the best heat conductivity. Obviously, in this form, the liquid fuels will be filmed over the successive rods until equilibrium vaporization is completed.

Another form of apparatus is shown in Fig. 5, in which the screens 23 are formed of perforated metal or foraminated plates, the peripheral edges of which are preferably cast into the wall of the conduit, so as to insure satisfactory heat conductivity.

As previously described, it is essential not only to produce, but to maintain and deliver a superheated dry gaseous mixture to the combustion chambers of the engine. Therefore, in order to maintain the dry gaseous condition after the liquid fuel has been vaporized under equilibrium conditions, it is desirable and common practice to arrange for conduction of heat from the exhaust manifold to the intake manifold, and, as heated air tends to rise, it is preferable, as hereinbefore described, to place the intake manifold above the exhaust manifold, in juxtaposition thereto, and/or provide conducting lugs or projections across the intervening space at intervals.

The operation of the apparatus described for carrying out my improved method will be readily understood from the description given. The liquid fuels picked up and carried along in the mixture from the carburetor are successively filmed, within and transversely of the mixture stream, on the foraminated members and subject to controlled temperature to effect vaporization in the presence of the complete vapors of the liquid fuels, so that throughout the operation, vaporization will take place under equilibrium conditions, the arrangement and application of heat being such that complete vaporization will take place at a minimum temperature. It will be understood that superheating of the combustibles in the air mixture cannot take place until after complete vaporization and, likewise the mixture does not become dry until after complete vaporization of the liquid fuels. With equilibrium vaporization, however, as previously pointed out, it has been found possible, by operating according to my method, to produce a homogeneous dry gaseous mixture in the shortest possible time and over relatively short length of the manifold conduit, a desirable feature with high speed operation, and when the available space for apparatus is limited. Furthermore, the mixture being maintained and delivered to the engine at a minimum superheat, insures maximum volumetric efficiency, with complete combustion and without the formation of objectionable products, thus giving the numerous advantages in operation hereinbefore referred to.

It will be further understood that while I have shown several forms of apparatus for carrying out my improved method, I do not wish to be limited to the particular apparatus shown, for obviously, various modifications therein may be made without departing from the spirit and scope of the invention.

I claim:—

1. In an internal combustion engine, the method of producing a homogeneous dry gaseous mixture of liquid fuels and air by equilibrium vaporization during the operation of the engine, which comprises impregnating a moving stream of air with liquid fuel particles in predetermined ratio to form the mixture, successively filming entrained liquid fuel particles in contiguous films transversely of the mixture stream, heating successively formed films while maintaining the fuel vapors in contact therewith until complete vaporization is effected under equilibrium conditions, the amount of heat applied being such that the temperature of the resulting dry gaseous mixture is not less than the temperature for complete equilibrium vaporization of the fuels in the ratio involved.

2. In an internal combustion engine, the method as claimed in claim 1, in which the mixture stream is subjected to alternate expansion and contraction, the contractions thereof being coincident with the filming heating stages.

3. In a internal combustion engine, the method of producing a homogeneous dry gaseous mixture of combustibles and air by equilibrium vaporization during the operation of the engine, which comprises impregnating a moving stream of air with atomized liquid fuel in predetermined ratio, filming the atomized liquid fuel in successive stages in contiguous films transversely of the mixture stream, heating the successive stages of films while maintaining the fuel vapors in contact therewith to effect vaporization under equilibrium conditions, and successively agitating the mixture in stages alternating with the heating filming stages.

4. The method according to claim 3 in which the heat applied to the filmed liquid fuels is maintained at a temperature such as will effect complete vaporization under equilibrium conditions and produce and deliver a superheated dry gaseous mixture at a predetermined temperature.

5. In an integral combustion engine, the method of producing a homogeneous dry gaseous mixture of combustibles and air by equilibrium vaporization during the operation of the engine, which comprises impregnating a moving stream of air with liquid fuels in predetermined ratio to form the mixture, filming the liquid fuels in successive stages in contiguous films transversely of the direction of flow of the mixture, heating the successive films in the presence of all the fuel vapors to effect vaporization under equilibrium conditions, while expanding and agitating the mixture in successive stages alternating with the filming heating stages, then superheating the mixture to a predetermined temperature and thereafter maintaining it as a homogeneous dry gaseous mixture, superheated above the dew point of the fuels, for delivery to the engine.

6. In an internal combustion engine, the method of producing a homogeneous dry gaseous mixture of combustibles and air by equilibrium vaporization during the operation of the engine, which comprises impregnating a moving stream under reduced pressure with liquid fuels in predetermined ratio to form the mixture, filming the liquid fuels at successive stages in a multiplicity of contiguous films transversely of the mixture stream, vaporizing the liquid fuels under partial pressure equilibrium conditions by heating the films at the successive stages in the presence of all the fuel vapors, successively creating turbulence in the mixture by agitation thereof alternately with the filming heating stages, the heat applied being at a temperature such as to produce complete equilibrium vaporization and to superheat the mixture to a temperature slightly above the dew point for the liquid combustibles under the partial pressures obtaining, then maintaining the mixture superheated for delivery to the engine.

7. In an internal combustion engine, the method of producing a homogeneous dry gaseous mixture of combustibles and air by equilibrium vaporization during the operation of the engine, which comprises impregnating a moving stream of air with liquid fuels in predetermined ratio to form the mixture, successively depositing entrained particles of the liquid fuels in contiguous films transversely of the direction of flow of the mixture, heating the successively formed films in the presence of all the fuel vapors to effect vaporization under equilibrium conditions, agitating the mixture by alternate expansion and contraction thereof while filming and vaporizing the liquid fuels, the temperature and amount of heat being adapted for vaporizing the liquid fuel and maintaining the mixture at a temperature slightly above the dew-point for the fuel vapors and to maintain and deliver the mixture with minimum superheat.

8. In an internal combustion engine, the method of producing a homogeneous dry gaseous mixture of combustibles and air by equilibrium vaporization during the operation of the engine, which comprises impregnating a moving stream of air with liquid fuels in predetermined ratio to form the mixture, alternately contracting and expanding the mixture stream in rapid succession, while filming entrained liquid particles in contiguous films transversely thereof, heating said mixture and the films in the presence of all the vapors so as to effect vaporization under equilibrium conditions, the temperature and amount of heat being adapted to comelpte equilibrium vaporization at a temperature slightly above the dew point for the liquid fuels and to maintain and deliver the mixture at a temperature not greatly in excess of said dew point.

CHARLES E. PARSONS.

CERTIFICATE OF CORRECTION.

Patent No. 1,663,507.                 Granted March 20, 1928, to

CHARLES E. PARSONS.

It is hereby certified that error appears in the printed specification of the above numbered patent requiring correction as follows: Page 6, line 16, claim 5, for the word "integral" read "internal"; and that the said Letters Patent should be read with this correction therein that the same may conform to the record of the case in the Patent Office.

Signed and sealed this 10th day of April, A. D. 1928.

(Seal)

M. J. Moore,
Acting Commissioner of Patents.